US009626403B2

(12) United States Patent
Peterson

(10) Patent No.: US 9,626,403 B2
(45) Date of Patent: Apr. 18, 2017

(54) RELATIONAL DATA MODEL VARIANT

(71) Applicant: Verizon Patent and Licensing Inc., Arlington, VA (US)

(72) Inventor: Rick Lee Peterson, Huntington Beach, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 14/559,507

(22) Filed: Dec. 3, 2014

(65) Prior Publication Data

US 2016/0162535 A1 Jun. 9, 2016

(51) Int. Cl.
*G06F 17/30* (2006.01)

(52) U.S. Cl.
CPC .. *G06F 17/30339* (2013.01); *G06F 17/30306* (2013.01); *G06F 17/30424* (2013.01); *G06F 17/30657* (2013.01); *G06F 17/30929* (2013.01); *G06F 17/30979* (2013.01)

(58) Field of Classification Search
CPC ......... G06F 17/30339; G06F 17/30424; G06F 17/30657; G06F 17/30979; G06F 17/30929; G06F 17/30306
USPC ........................................ 707/696, 713, 769
See application file for complete search history.

(56) References Cited

U.S. PATENT DOCUMENTS

| 7,512,639 | B2 * | 3/2009 | Chowdhary | G06F 17/30292 |
| 7,822,775 | B2 * | 10/2010 | Langer | G06F 17/30595 707/717 |
| 8,560,936 | B2 * | 10/2013 | Merkel | G06F 17/18 715/227 |
| 9,110,975 | B1 * | 8/2015 | Diligenti | G06F 17/30646 |
| 2002/0016771 | A1 * | 2/2002 | Carothers | G06F 17/30569 705/43 |
| 2014/0280368 | A1 * | 9/2014 | Kemmler | G06F 17/30294 707/803 |

FOREIGN PATENT DOCUMENTS

JP 2002149452 A * 5/2002 ............. G06F 12/00

* cited by examiner

*Primary Examiner* — Frantz Coby

(57) ABSTRACT

Systems and methods for handling queries are disclosed. A computer determines that a data-table includes a problematic-key. The problematic-key includes a key used in queries that fails to generate results within a threshold time period. The computer creates a variant-table configured to store at least a portion of the data in the data-table and optimize processing queries using the problematic-key. The computer receives a new query including a key. Upon determining that the query-key is a problematic-key and that resolving the new query using information associated with a latest update time of the variant-table is acceptable, the computer generates a result for the new query using the variant-table. Upon determining that the query-key is a not a problematic-key or that resolving the new query using information associated with a latest update time of the variant-table is unacceptable, the computer generates a result for the new query using the data-table.

20 Claims, 6 Drawing Sheets

RELATIONAL DATA MODEL VARIANT

BACKGROUND

Businesses and organizations, for instance telephone companies, banks, governments, and educational institutions, store databases that grow in size with time (e.g., as telephone companies acquire more customers or as educational institutions acquire more students and alumni). The databases are used to generate results to queries. For example, a bank database may be queried for transactions on account number XXX dated between Jan. 1, 2014, and Jan. 31, 2014. However, in some cases, as a volume of data stored by a database increases, queries may become slower, making the database unable to respond to certain queries within a reasonable amount of time. In some cases, the database may be replaced with a more modern database that operates more efficiently. However, replacing an old database with a more modern database may not be desirable due to the expense, in terms of time, money, and potential errors, of reprogramming a large amount of software for interfacing with the old database. As the foregoing illustrates, an approach to increase query processing speed and efficiency of a database without replacing the database may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
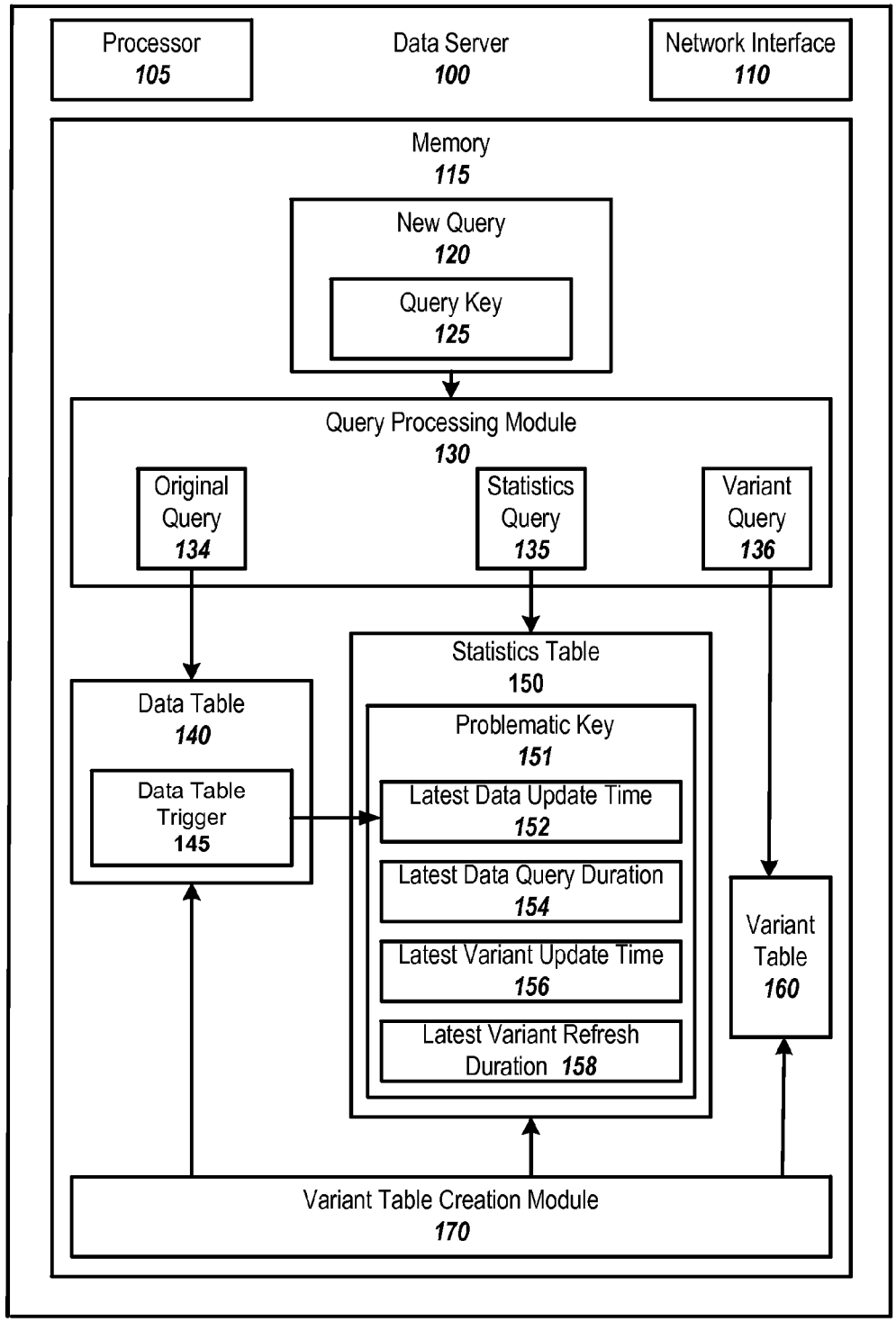
FIG. 1 illustrates an exemplary data server configured for handling queries.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for increasing query processing speed and efficiency. According to some implementations, queries are generated using keys. As used herein, the term "key" may include any value based on which a query of a data repository may be executed. For instance, a key may include any information used to identify an account (e.g., account number, account holder's name, account holder's social security number, credit or debit card information, etc.). For example, in a banking environment, the keys may include account number, date, transaction amount, transaction type, etc. In a telephone company environment, the keys may include customer account number, customer telephone number, payment account identifier, payment date, etc.

A data server may determine that a data table has problematic key(s). The problematic key(s) may include key(s) where queries using the key(s) fail to generate results within a threshold time period (e.g., 10 seconds, 30 seconds, 1 minute, 5 minutes, 1 hour, etc.). These key(s) may be problematic because users may be unable to get results for their queries within a reasonable time. For example, in a banking environment, a user searching for transactions between $100 and $200 between Jan. 1, 2014, and Jan. 31, 2014 may be willing to wait 2-3 seconds to get the search results, but may become frustrated if the search results are not presented within 10-20 seconds. The threshold time period may be set by a programmer programming software for implementing the subject technology within the software code. The threshold time period may be based on the processing speed of the data server, the amount of data processed by the data server, etc. Upon determining that the data table has problematic key(s), the data server may create a variant table. The variant table stores the same data as the data table or a portion of the data table's data. The variant table is designed to optimize processing of queries using the problematic key(s). In some cases, a single variant table may be created to process multiple queries using all of the problematic key(s). In other cases, multiple variant tables may be created, each for processing unique queries against one data table. The data table is associated with a first data model and the variant table is associated with a second data model, different from the first data model. The second data model may be partitioned by the problematic key(s), so that all the data associated with each value for the problematic key(s) is in the same part of the second data model and, thus, easily accessible. For example, if the problematic key corresponds to a merchant name, the second data model may include data being partitioned by merchant name, so that the second data model may be searched quickly and easily using the merchant name. Dedicated partitions for each problematic key value allows data refreshing in variant tables for a single problematic key without impacting queries using other problematic key values.

Each key may have a different amount of data in the data table. The more rows of data in the data table for the requested key, the longer the query may take to respond with data. Some keys may be fast, while other keys may be slow. The variant table may be used for data associated with slow keys. In some cases, if certain keys are more problematic than others, dedicated (e.g., instead of shared) partitions of the variant table may be used. One variant table may be created for each unique query against the data table. Multiple unique queries may result in multiple variant tables based on the same data table and the same key value.

FIG. 1 illustrates an exemplary data server 100 configured for processing queries. As shown, the data sever 100 includes a processor 105, a network interface 110, and memory 115. The processor 105 executes instructions stored in a computer-readable medium, such as the memory 115. While a single processor 105 is illustrated, the data server 100 may have multiple processors. The multiple processors may be arranged into processing units, such as a central processing unit (CPU) or a graphics processing unit (GPU). The network interface 110 connects the data server 100 to a network, for example, the Internet, an intranet, a local area network, a wide area network, a wired network, or a wireless network. The memory 115 stores data or instructions. As shown, the memory 115 stores a new query 120, a query processing module 130, a data table 140, a statistics table 150, a variant table 160, and a variant table creation module 170.

The data table 140 is programmed to receive a query including a key and to provide a result to the query. The data table 140 may be relatively old by server standards (e.g., 10-20 years old) and may store much more data than it was initially designed to store. As such, the data table 140 may process some queries slowly. For example, if the data table 140 uses a linear walk to resolve a query, the linear walk may be efficient if the data table 140 includes 1000 rows, but not when the data table includes 1,000,000 rows due to growth of the data table 140 over many years. A linear walk may include processing each element in a list (or other data structure, such as an array, a table, etc.) one at a time, for example, first checking whether the first element of the list meets the query, then the second element, then the third element, etc. The data table 140 includes a data table trigger 145. The data table trigger 145, when activated, causes the stats table 150 to be updated. For example, in a banking environment, the data table trigger 145 may be a new transaction occurring or a new account being opened.

The variant table creation module 170, when executed, determines that the data table 140 has one or more problematic keys. The fact that the data table 140 has one or more problematic keys may be determined, at the data server 100, based on queries including the problematic key(s) failing to generate results within a threshold time period (e.g., 10 seconds, 1 minute, 1 hour, etc.) after the queries were received. The threshold time period may be timed using a clock in the data server 100. The problematic key(s) may include key(s) which, when provided within a query to the data table 140, fail to generate results within a threshold time period. The variant table creation module 170 may store the problematic key(s) as problematic key(s) 151 in the statistics table 150. The determination that the data table 140 has one or more problematic keys may be based on factor(s) including: the amount of data related to the key, actual performance timing(s) of key(s) computed by the query router. Key(s) having high actual performance timing(s), e.g., actual performance timing(s) exceeding a threshold, such as 30 seconds, may correspond to the problematic key(s).

The variant table creation module 170 creates the variant table 160, which stores all or a portion of the data in the data table 140. The variant table 160 may store all of the data in the data table 140, and may be a backup of the data table 140. Alternatively, the variant table may store a portion of the data in the data table that is associated with the problematic key(s). For example, if the problematic key(s) include merchants whose names begin with 'Z', the variant table 160 may store only transactions associated with those merchants, and not transactions associated with other merchants. The variant table 160 is arranged to optimize processing queries using the one or more problematic keys 151. For example, the variant table 160 may be partitioned by values of the problematic key(s) 151, so that all the data associated with each value for the problematic key(s) 151 is in the same part of the variant table 160 and, thus, easily accessible. The variant table 160 may include hash function(s) for the problematic key(s) 151, so that queries using the problematic key(s) 151 may be processed in an amount of time that is independent of the size of the variant table 160. A hash function may include a function that maps an input (e.g., a value of a problematic key 151) to an output (e.g., a position in the variant table 160) in an amount of time that does not depend on the size or value of the input.

In some cases, the variant table 160 may store only the slowest threshold percentage (e.g., 1% or 2%) of keys and associated data. In some cases, the variant table 160 may store all of the data in the data table 140 to more efficiently handle all queries. In some cases, the variant table 160 is not a backup of the data table 140 and contains a simplified subset of columns from the original data table 140. The variant table 160 may have as many rows of data as the data table 140, while storing different data. The variant table 160 may be an abstract or simplified version of the data table 140.

As shown, the statistics table 150 stores latest update times 152 and 156 for a key. The latest update times 152 and 156 correspond to the latest times when the corresponding key in table 140 or 160 was updated or created (if the corresponding data in table 140 or 160 has not been updated since its creation). The data table 140 and the variant table 160 may have different latest update times 152 and 156, due to asynchronous updating of table 160. In other words, when the data table 140 receives an update, the variant table 160 may not necessarily also receive an update. For example, the variant table 160 may be created on Jan. 1, 2014. On Mar. 1, 2014, the data table 140 may be updated using software for updating the data table 140. However, the variant table 160 may not also be updated, for example, if the software for updating the data table 140 does not also update the variant table 160. In these circumstances, the latest update time 156 for the variant table 160 is Jan. 1, 2014, and the latest update time 152 for the data table 140 is Mar. 1, 2014. In some cases, the time difference may be much shorter than the two months specified above, for example, between one second and 24 hours. The statistics table 150 also stores a latest data query duration 154 and a latest variant refresh duration 158. The latest variant refresh duration 158 corresponds to an amount of time it took to refresh data in the variant table 160. The latest data query duration 154 corresponds to an amount of time in which a latest query in the data table 140 was processed.

The new query 120, when executed by the processor 105, causes the processor 105 to invoke the query processing module 130. As shown, the new query 120 has a query key 125. The query processing module 130 determines, by comparing the new query key 125 to the stored problematic key(s) 151, whether the new query key 125 is one of the stored problematic key(s) 151. The query processing module 130 determines whether resolving the new query 120 using stored data that is associated with the latest update time 156 of the variant table 160 is acceptable. For example, if the latest variant update time 156 is Jan. 1, 2014, and the user is querying for data from February 2014, resolving the query using stored data associated with the latest variant update time 156 of the variant table 160 may not be acceptable. Alternatively, if the user is querying for data from November 2013, resolving the query using stored data associated with the latest variant update time 156 of the variant table 160 (Jan. 1, 2014) may be acceptable. For example, the processor 105 may prompt a user to inform the data server 100 regarding whether resolving the new query 120 based on stored data that is associated with the latest update time 156 of the variant table 160 is acceptable. The user may be accessing the data server 100 remotely over a network using the network interface 110. The user may be notified of both the latest update time 156 of the variant table 160 and the latest update time 152 of the data table 140, and that the variant table 160 may process queries more quickly than the data table 140. Alternatively, an optional parameter may be provided to the query processing module 130 allowing the user to specify his/her tolerance for stale data. If the user specifies a 12 hour tolerance, and the variant table 160 has data for the query key 125 that is only six hours stale, the variant query 136 may be executed in place of the original query 134. When the optional parameter is not used, the query processing module may run the original query 134 when data for the query key 125 in the variant table 160 is out of sync with the data table 140. The stale age may be computed by subtracting the latest variant update time 156 from the latest data update time 152.

The query processing module 130, when executed, may cause the query key 125 to be resolved as an original query 134 using the data table, a variant query 136 using the variant table, or a statistics query 135 using the statistics table. If the query key 125 is one of the problematic key(s) 151, as discussed above, the variant query 136 may be used. If the query key 125 involves a query for statistics stored in the statistics table 150, for example, a query for stored problematic key(s) 151, the statistics query 135 may be used. If the query key 125 is not one of the problematic key(s) 151, the original query 134 may be used.

In one example, the user may be searching a data server 100 of a credit card company for a transaction that the user had with XYZ Merchant. The user may remember that this transaction occurred when the user was vacationing in Paris during the spring of 2013. The user may not remember the exact date of the transaction. The user may be queried (via a client computing device accessing the data server 100) regarding whether search results before the latest variant update time 156 is appropriate. The user may be notified that the latest variant update time 156 is Jan. 1, 2014, and the latest data update time 152 is May 1, 2014. The user may indicate that resolving the query based on the latest variant update time 156 of the variant table 160 (Jan. 1, 2014) is acceptable. Alternatively, if the user remembers that the transaction took place during the March or April 2014, not the spring of 2013, or if the user has no recollection of the date of the transaction, the user may indicate that resolving the query based on the latest variant update time 156 (Jan. 1, 2014) is not acceptable.

When executing the query processing module 130, if the query key 125 is one of the problematic key(s) 151 and the result for the new query 120 that is associated with the latest variant update time 156 is acceptable, the processor 105 generates a result for the new query 120 using the variant table 160. If the query key 125 is not one of the problematic key(s) 151 or the result for the new query 120 that is associated with the latest variant update time 156 is unacceptable, the processor 105 generates a result for the new query 120 using the data table 140, as the data table 140 may have been updated more recently than the variant table 160. The processor 105 provides an output including the generated result for the new query 120.

Table 1 illustrates an exemplary reference table. Table 2 illustrates an exemplary data table, which may correspond to the data table 140. Table 3 illustrates an exemplary variant table, which may correspond to the variant table 160. While Table 1, Table 2, and Table 3 are relatively small tables, the subject technology may be implemented with larger tables having thousands, millions, or billions of rows.

TABLE 1

Exemplary Reference Table Hierarchies

| Hierarchy | Type | Company |
|---|---|---|
| 1 | Billing | ABC |
| 2 | Reporting | ABC |

TABLE 2

Exemplary Data Table Nodes

| Node | Parent | Hierarchy | Name | Type |
|---|---|---|---|---|
| 1 |  | 1 | Root 1 | Folder |
| 2 | 1 | 1 | Billing Folder 1 | Folder |
| 3 | 2 | 1 | Account 1 | Account |
| 4 | 2 | 1 | Service 1 | Service |
| 5 | 1 | 1 | Billing Folder 2 | Folder |
| 6 | 5 | 1 | Account 2 | Account |
| 7 | 5 | 1 | Service 2 | Service |
| 8 |  | 2 | Root 2 | Folder |
| 9 | 8 | 2 | Reporting Folder 1 | Folder |
| 10 | 9 | 2 | Account 1 | Account |
| 11 | 9 | 2 | Account 2 | Account |
| 12 | 8 | 2 | Reporting Folder 2 | Folder |
| 13 | 12 | 2 | Service 1 | Service |
| 14 | 12 | 2 | Service 2 | Service |

TABLE 3

Exemplary Variant Table Nodes Variant

| Node | Parent | Hierarchy | Path | Name | Type | Account |
|---|---|---|---|---|---|---|
| 1 |  | 1 | 1. | Root 1 | Folder |  |
| 2 | 1 | 1 | 1.2. | Billing Folder 1 | Folder |  |
| 3 | 2 | 1 | 1.2.3. | Account 1 | Account |  |
| 4 | 2 | 1 | 1.2.4. | Service 1 | Service | Account 1 |
| 5 | 1 | 1 | 1.5. | Billing Folder 2 | Folder |  |
| 6 | 5 | 1 | 1.5.6. | Account 2 | Account |  |
| 7 | 5 | 1 | 1.5.7. | Service 2 | Service | Account 2 |
| 8 |  | 2 | 8. | Root 2 | Folder |  |
| 9 | 8 | 2 | 8.9. | Reporting Folder 1 | Folder |  |
| 10 | 9 | 2 | 8.9.10. | Account 1 | Account |  |
| 11 | 9 | 2 | 8.9.11. | Account 2 | Account |  |
| 12 | 8 | 2 | 8.12. | Reporting Folder 2 | Folder |  |
| 13 | 12 | 2 | 8.12.13. | Service 1 | Service | Account 1 |
| 14 | 12 | 2 | 8.12.14. | Service 2 | Service | Account 2 |

In the exemplary tables above, all possible queries can be resolved using tables 1 and 2. However, several require expensive logic. Determining which account a service belongs to may be implemented using the following 4 steps: 1) Lookup Company in Table 1 where Hierarchy matches Hierarchy from Table 2's service row. 2) Lookup Hierarchy in Table 1 where Company value matches Company from step 1 and Type is "Billing". 3) Lookup Parent in Table 2 where Hierarchy value matches Hierarchy from step 2, Type is "Service", and Name equals the same service from step 1. 4) Lookup the account in Table 2 using the Parent from step 3 and Type is "Account".

The addition of the Path column to Table 3 avoids expensive "connect by" hierarchical syntax. The "connect by" syntax requires recursive or iterative processing, which is not efficient. Appending a dot to the path simplifies the syntax required to find nodes using a position. When searching for data in context of Company Folder 1, searching path values with 7.8* will cause errors because it will match values such as 7.80. Without the appended dot, the where clause has to be written as follows: path='7.8' or path like '7.8.%'. With the appended dot, the where clause may instead be written as follows: path like '7.8.%'. A where clause in a SQL query applies a filter which return a subset of data from a table. The above query should return 7.8 and 7.8.1, but not 7.80. 7.8* would erroneously match 7.81. Without the appended dot, we have to search for both 7.8 and 7.8.*. With an appended dot in the variant table's path column values, we can just search for 7.8.* and it will not find 7.80.

The addition of the Account column to Table 3, relative to Table 2, avoids complex sub queries to find corresponding account numbers for services in other data structures (e.g., belonging to the same company). Complex sub-queries may be used to populate the Account column in Table 3. With the Account column populated in Table 3, application queries can just select account numbers from the Account column from the variant table without using the complex sub-queries, which would have been required had Table 3 not been created.

Below is an example of code corresponding to a complex sub-query which may be used in conjunction with the data table 2.

```
WITH pos AS (SELECT 93445 AS hid, '93444' AS node FROM DUAL),
    bill
    AS (SELECT    b.hierarchy
           FROM   pos, hierarchies h, hierarchies b
           WHERE         h.hierarchy = pos.hid
                   AND   h.company = b.company
                   AND   b.TYPE = 'Billing'),
    pos_ent
    AS (  SELECT    n.*
            FROM    pos, nodes n
            WHERE   pos.hid = n.hierarchy
            START WITH  n.node = pos.node
            CONNECT BY  PRIOR n.node = n.parent),
    pos_acct
    AS (SELECT    *
           FROM   pos_ent
           WHERE  TYPE = 'Account'),
    pos_serv
    AS (SELECT    *
           FROM   pos_ent
           WHERE  TYPE = 'Service'),
    bill_ent
    AS (SELECT    name, TYPE, parent
           FROM   bill, nodes hnba
           WHERE         hnba.hierarchy = bill.hierarchy
                   AND (hnba.TYPE = 'Account' OR hnba.TYPE = 'Service')),
    bill_acct
    AS (SELECT    name, TYPE, parent
           FROM   bill_ent
           WHERE  TYPE = 'Account'),
    bill_serv
    AS (SELECT    name, TYPE, parent
           FROM   bill_ent
           WHERE  TYPE = 'Service'),
    serv_acct
    AS (SELECT    ba.name AS account,
                  ps.name AS service
           FROM   pos_serv ps, bill_serv bs, bill_acct ba
           WHERE  ps.name = bs.name AND bs.parent = ba.parent)
SELECT account,    service FROM serv_acct
UNION ALL
SELECT name,
       NULL
  FROM pos_acct a;
```

Below is an example of the code above which does not require the complex sub-query and which may be used in conjunction with the variant table 3.

```
SELECT v.account,
   CASE
        WHEN type = 'Service' THEN v.name
        ELSE NULL
   END
        AS service
   FROM nodes_variant v
 WHERE    v.hierarchy = 93445
      AND v.PATH LIKE '93444.%'
      AND v. type IN ('Account', 'Service');
```

Figure 2:
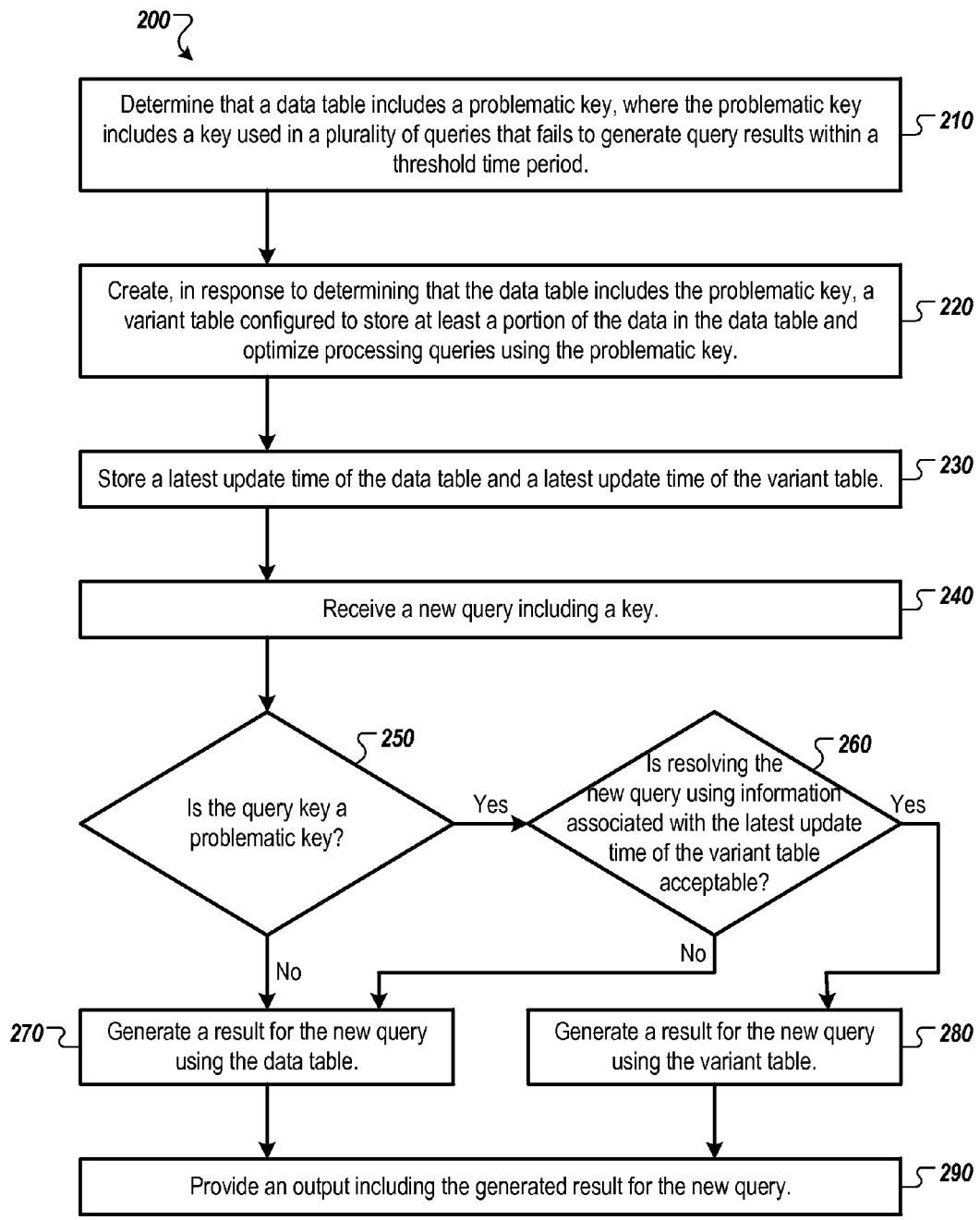
FIG. 2 illustrates an exemplary process for handling a query.

FIG. 2 illustrates an exemplary process 200 for handling a query. The process 200 begins at step 210, where a computing device (e.g., data server 100) determines that a data table (e.g., data table 140) includes a problematic key. The problematic key includes a key used in a plurality of queries that fail to generate query results within a threshold time period. The computing device may determine that the data table includes the problematic key by attempting, within a threshold time period (e.g., 30 seconds) to generate query results for multiple queries using the data table and failing to do so within the threshold time period.

In step 220, the computing device creates, in response to determining that the data table includes the problematic key, a variant table. The variant table is configured to store all or a portion of the data in the data table. The variant table is optimized for processing queries using the problematic key. The data table may be associated with a first data model and the variant table may be associated with a second data model different from the first data model. The second data model may be partitioned by the problematic key. For example, as shown above, Table 3 adds, to the model in Table 2, the path column and the account column to improve query performance.

In step 230, the computing device stores a latest update time of the data table and a latest update time of the variant table. The computing device may store the data table and the variant table and, thus, have access to their latest update times. Alternatively, the computing device may communicate (e.g., over a network) with a data repository storing the data table or the variant table and, thus, have access to their latest update times. The latest update time of the data table corresponds to the latest time when the data table was updated. The latest update time of the variant table corresponds to the latest time when the variant table was created or updated. The data table and the variant table may be updated at different times, for example, because new data that is added to the data table may not be propagated to the variant table until code for updating the variant table is executed or the variant table is manually updated. New data may be added to the data table using old software that is difficult or expensive to modify. This software may add data to the data table without propagating the changes to the variant table, as this software may have been written many years ago before the variant table was first created.

The computing device may receive an update for the data table. For example, if the computing device is a data server of a bank, a new account may be opened at the bank and the data table may be updated to reflect the new account. The data table may be updated and the latest update time of the data table may be changed responsive to the received update. However, the computing device may forego updating the variant table and the latest update time of the variant table responsive to the received update, for example, because software code for updating the variant table in response to an account opening has not yet been written or because updating the variant table would add complexity to the new account opening procedure or data table updating procedure. This complexity may not be desirable, for example, to allow code to be reviewed, studied, or modified more easily.

In step 240, the computing device receives a new query including a key. The new query may be entered by a user directly into the computing device. Alternatively, the new query may be received, at the computing device, from a remote computer via a network.

In step 250, the computing device determines whether the query key is a problematic key, for example, by comparing the query key and the problematic keys. The problematic keys may be stored in the memory of the computing device. If the query key is among the problematic keys, the process 200 continues to step 260. Otherwise, the process 200 continues to step 270.

In step 260, the computing device determines whether resolving the new query using information that is associated with the latest update time of the variant table is acceptable. For example, the computing device may provide the user with the latest update time of the data table and the latest update time of the variant table, and prompt the user to input whether resolving the new query using information associated with (e.g., generated before) the latest update time of the variant table is acceptable. Alternatively, the computing device may automatically determine whether resolving the new query using information associated with the latest update time of the variant table is acceptable, for example, based on a time specification include in the query (e.g., if the query is searching from data from 2013 and the latest update time of the variant table is Jan. 1, 2014). If resolving the new query using information associated with the latest update time of the variant table is acceptable, the process 200 continues to step 280. Otherwise, the process 200 continues to step 270.

In step 270, upon determining that the query key is not a problematic key or that resolving the new query using information associated with the latest update time of the variant table is unacceptable, the computing device generates a result for the new query using the data table. The computing device may access the data table to generate the result for the new query. After step 270, the process 200 continues to step 290.

In step 280, upon determining that the query key is a problematic key and that resolving the new query using information associated with the latest update time of the variant table is acceptable, the computing device generates a result for the new query using the variant table. The computing device may access the variant table to generate the result for the new query. After step 280, the process 200 continues to step 290.

The computing device may store a refresh variant table priority value. This value may be set to an initial level (e.g., 0). Upon determining that the result for the new query that is associated with the latest update time of the variant table is unacceptable, the refresh variant table priority value may be incremented. When the refresh variant table priority value exceeds a threshold value, the variant table may be updated based on at least a portion of the data in the data table. The latest update time of the variant table may be changed. The refresh variant table priority value may be reset to a level associated with the variant table being updated, for example, the initial level. For example, a pending modifications counter may be placed in the statistics table 150 of the data server 100 of FIG. 1. The pending modifications counter may be used as a flag and the pending modifications value may be reset to zero at the completion of a refresh. Activity may be used to establish priority. The more recent the last activity is, the higher the priority the refresh for the key associated with the activity may have.

In step 290, the computing device provides an output including the generated result for the new query. The output may be provided via a display unit of the computing device. Alternatively, the output may be transmitted, over a network, to a remote computer. After step 290, the process 200 ends.

As set forth above, the steps 210-290 of the process 200 are implemented serially according to the order described. However, in some implementations, the steps 210-290 may be implemented in parallel or in any order. In some cases, one or more of the steps 210-290 may be skipped.

Figures 3, 4:
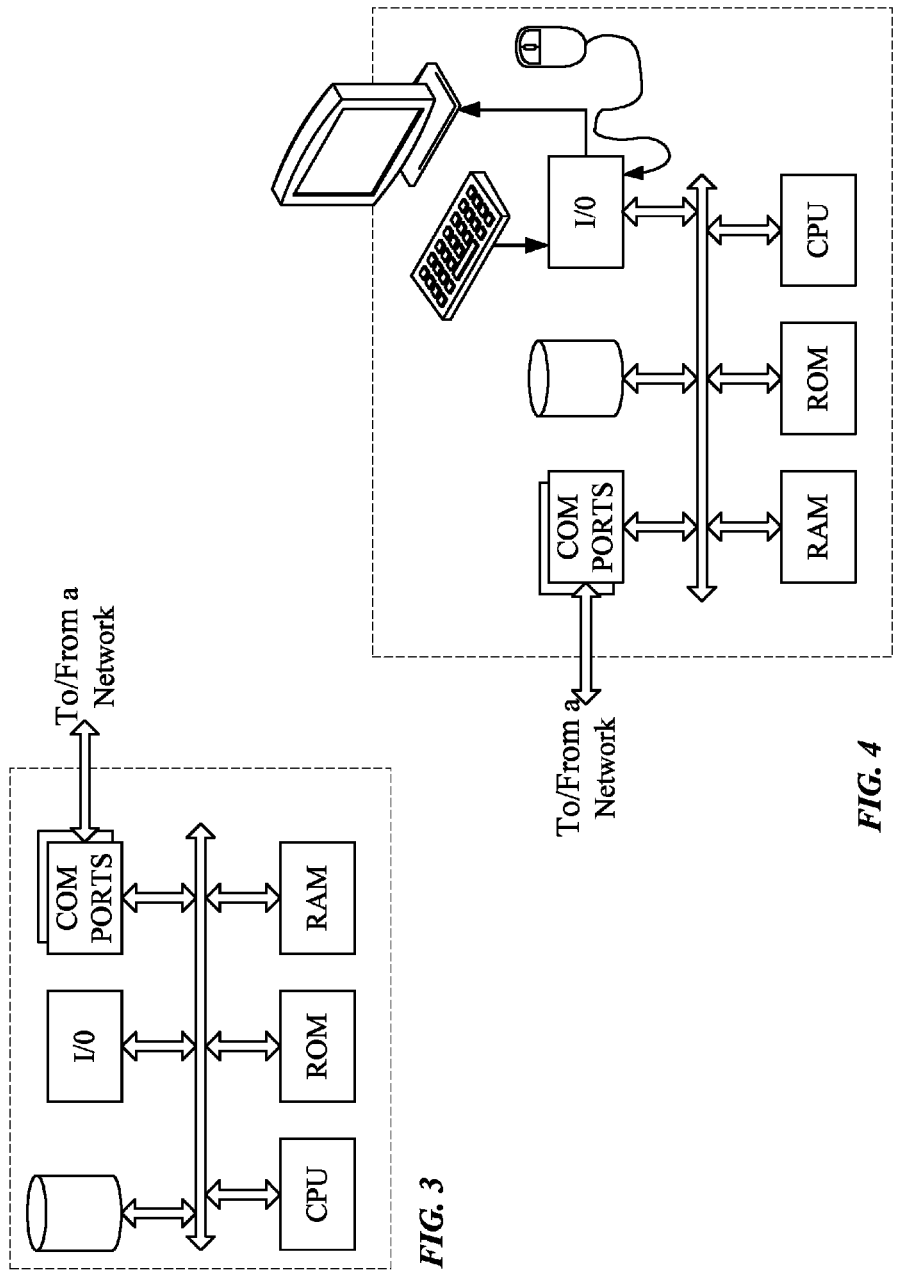
FIG. 3 is a simplified functional block diagram of a computer that may be configured to function as the data server shown in FIG. 1.
FIG. 4 is a simplified functional block diagram of a personal computer or other work station or terminal device, from which a user may access the data server shown in FIG. 1.

The data server 100 of FIG. 1 or machine(s) implementing the process 200 of FIG. 2 may include general purpose computer(s) programmed to implement the functionality described herein. The general purpose computer(s) may include hardware platforms, for example, as illustrated in FIGS. 3 and 4. Alternatively, any other computer platform may be used in place of those illustrated in FIGS. 3 and 4.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that the general structure and general operation of such equipment as shown in FIGS. 3 and 4 should be self-explanatory from the high-level illustrations. The server of FIG. 3 may correspond to the data server 100 of FIG. 1. The computer of FIG. 4 may correspond to a remote computer used to access the data server 100 or, alternatively, to the data server 100 itself.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 4). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of handling queries outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the supply chain management module 225, the display unit driver 230, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Figure 5:
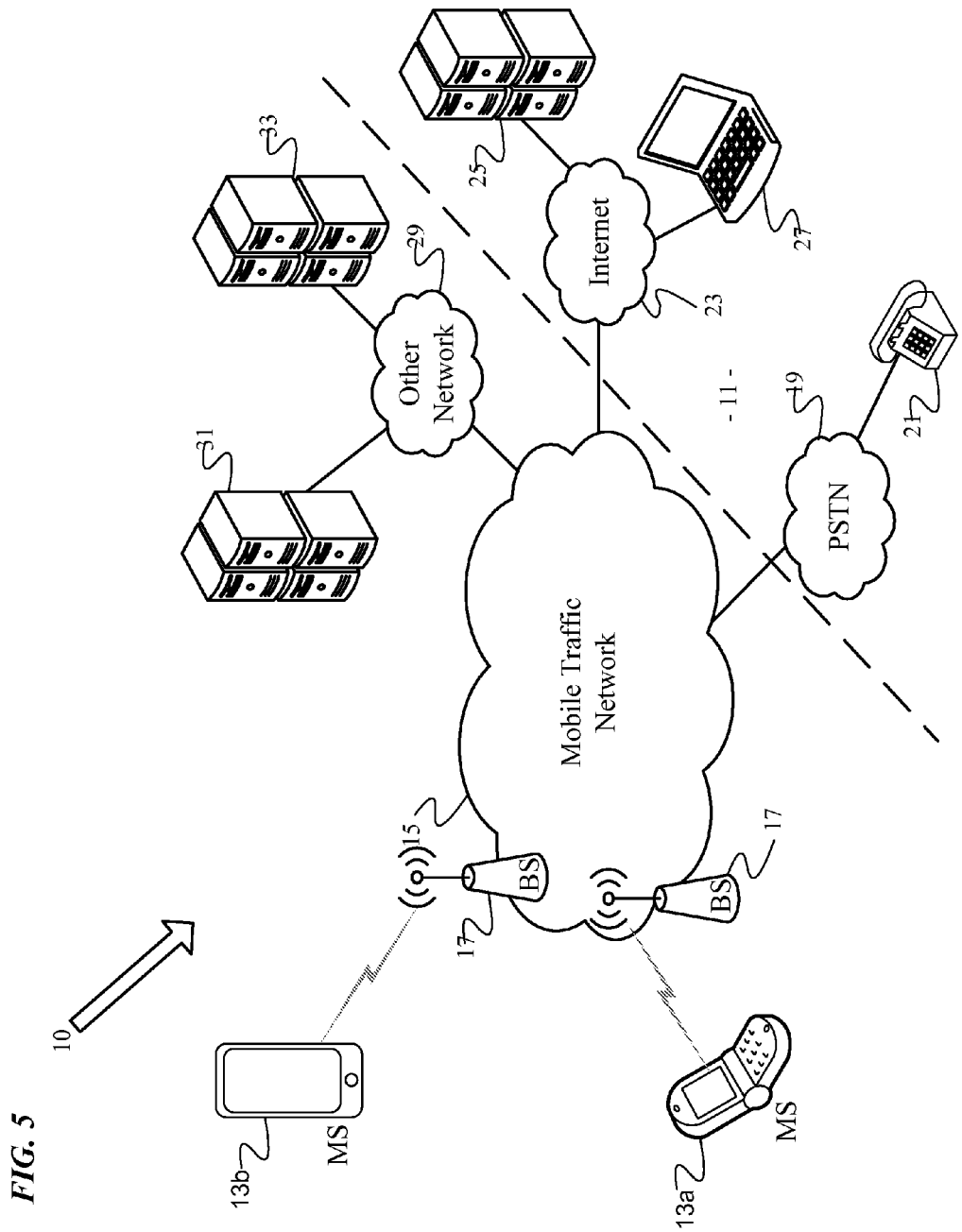
FIG. 5 is a high-level functional block diagram of an example of a system of networks/devices in which queries may be handled.

FIG. 5 illustrates a system 10 offering a variety of mobile communication services in which queries may be handled. The data server 100 of FIG. 1 may correspond to the server 25 connected to the Internet 23. The server 25 may be accessed by user(s) from client computing device(s) including the mobile stations 13a and 13b and the laptop PC type user terminal 27. While FIG. 5 illustrates a mobile network system, the subject technology may be used with any network, not necessarily a mobile network.

The example shows simply two mobile stations (MSs) 13a and 13b as well as a mobile communication network 15. The stations 13a and 13b are examples of mobile stations. The network 15 provides mobile wireless communications services to those stations as well as to other mobile stations (not shown), for example, via a number of base stations (BSs) 17. The drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may are capable of voice telephone communications through the network 15, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

Figure 6:
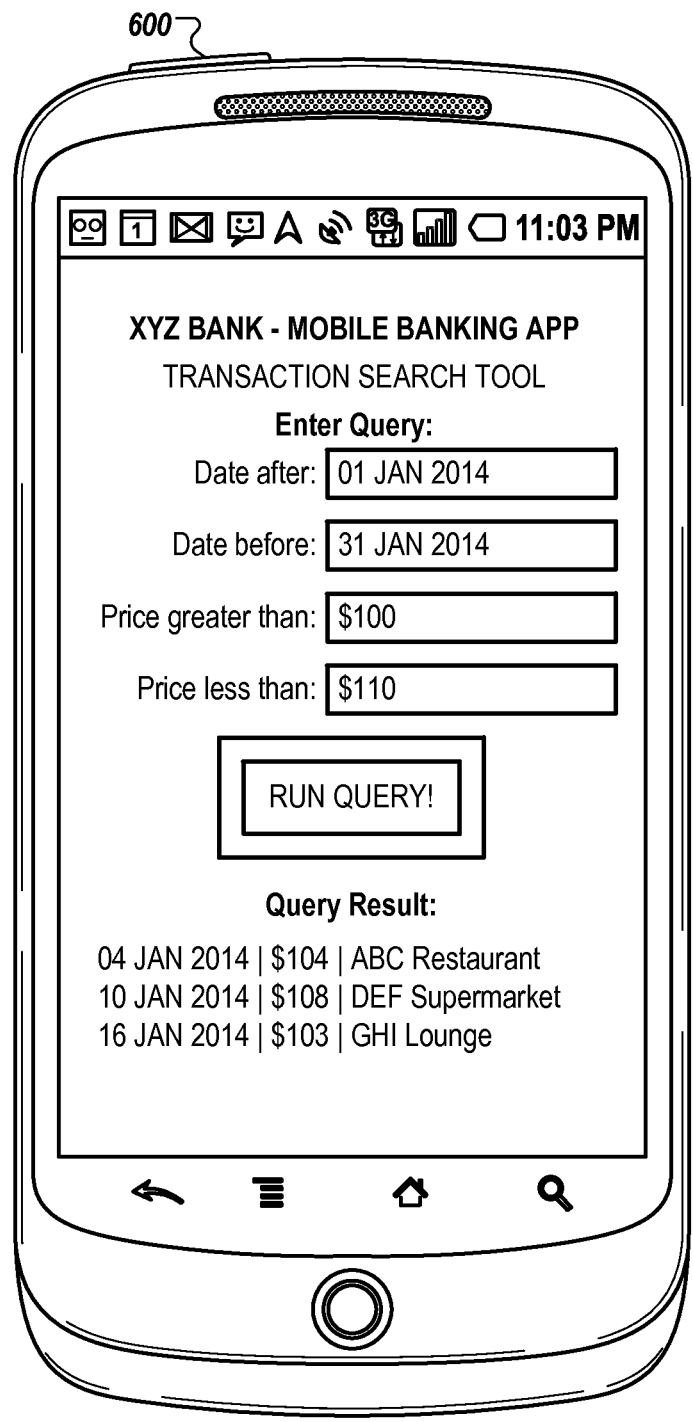
FIG. 6 illustrates an example mobile station which may be used for handling a query.

FIG. 6 illustrates an example mobile station 600 which may be used for handling a query. The mobile station 600 may correspond to the mobile stations 13 of FIG. 5. As shown, the mobile station is presenting an interface for a mobile banking app of XYZ Bank. The mobile banking app of XYZ Bank includes a transaction search tool, using which a user may enter queries for searching for transactions in his/her account(s). As shown, the user has entered a query for transactions dated between Jan. 1, 2014, and Jan. 31, 2014, and having a price between $100 and $110. After entering this query, the user may press the "RUN QUERY!" button. In response, the mobile banking app queries the data server (e.g., data server 100 of FIG. 1) for the corresponding transactions and displays the transactions that satisfy the query at the bottom of the screen of the mobile station 600. While FIG. 6 illustrates a mobile station which may be used for handling a query, any other client computing device, for example, a laptop computer, a desktop computer, etc., may be used in place of the mobile station 600. Also, a web browser directed to a webpage of XYZ Bank may be used in place of the mobile banking app of XYZ Bank.

Figure 7:
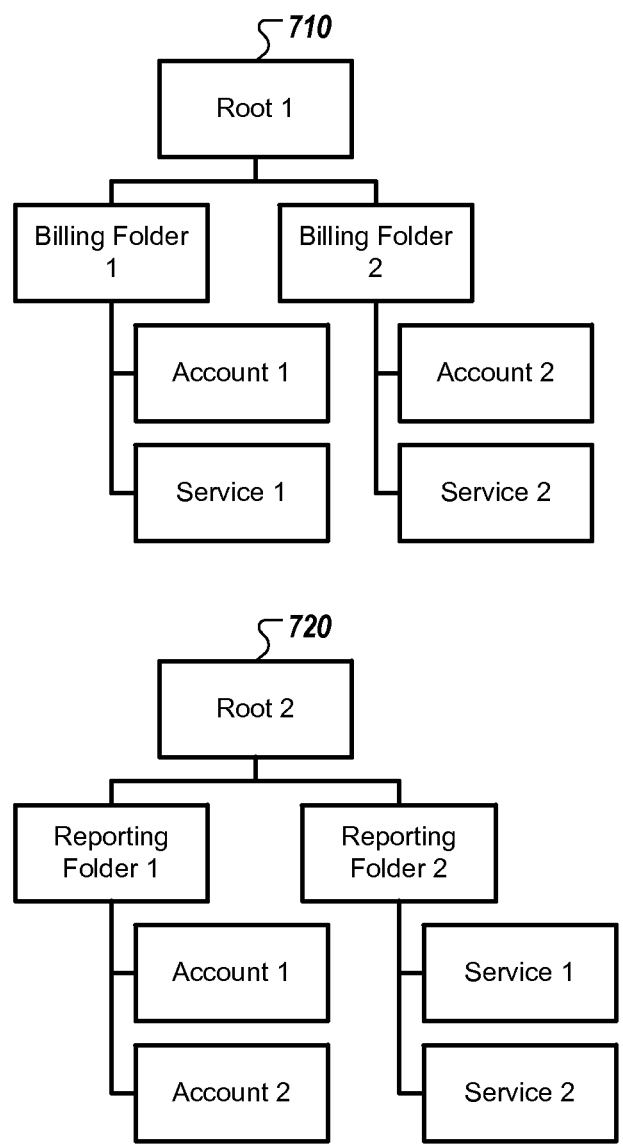
FIG. 7 illustrates two exemplary file systems with which the subject technology may be implemented.

FIG. 7 illustrates two exemplary file systems 710 and 720 with which the subject technology may be implemented. In file system 710, a root 1 directory has a billing folder 1 subdirectory and a billing folder 2 subdirectory. The billing folder 1 subdirectory contains account 1 and service 1. The billing folder 2 subdirectory contains account 2 and service 2.

In file system 720, a root 2 directory has the subdirectories reporting folder 1 and reporting folder 2. The reporting folder 1 subdirectory contains account 1 and account 2. The reporting folder 2 subdirectory contains service 1 and service 2. As shown, the contents—account 1, account 2, service 1, and service 2—are the same in both file systems 710 and 720. However, the arrangement of billing folders in file system 710 and reporting folders in file system 720 are different to optimize the processing of different types of queries (e.g., queries based on billing in file system 710, and queries based on reporting in file system 720). The file system 710 corresponds to data in the data table 140 of FIG. 1, and the file system 720 corresponds to data in the data table 140 of FIG. 1, optimized for processing queries based on reporting.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, using a computing device, that a data table includes a problematic key, wherein the problematic key includes a key used in a plurality of queries that fails to generate query results within a threshold time period;
   creating, in response to determining that the data table includes a problematic key, a variant table configured to store at least a portion of the data in the data table and optimize processing queries using the problematic key;
   storing an update time of the variant table;
   receiving a new query including a key;
   determining whether the key is the problematic key;
   determining whether resolving the new query using information associated with the update time of the variant table is acceptable;
   upon determining that the query key is a problematic key and that resolving the new query using information associated with the update time of the variant table is acceptable, generating a result for the new query using the variant table; and
   upon determining that the query key is not a problematic key or that resolving the new query using information associated with the update time of the variant table is unacceptable, generating a result for the new query using the data table.

2. The method of claim 1, further comprising providing, using the computing device, an output including the generated result for the new query.

3. The method of claim 1, further comprising:
   receiving an update for the data table;
   updating the data table responsive to the received update; and
   foregoing updating the variant table and the update time of the variant table responsive to the received update.

4. The method of claim 1, further comprising:
   setting a refresh variant table priority value to an initial level;
   upon determining that resolving the new query using information associated with the update time of the variant table is unacceptable, adjusting the refresh variant table priority value; and
   upon determining that the refresh variant table priority value exceeds a threshold value:
      updating the variant table based on the at least a portion of the data in the data table;
      updating the update time of the variant table; and
      resetting the refresh variant table priority value to a level associated with the variant table being updated.

5. The method of claim 1, wherein the data table is associated with a first data model, and wherein the variant table is associated with a second data model, different from the first data model.

6. The method of claim 5, wherein the second data model is partitioned by the one or more problematic keys.

7. The method of claim 1, wherein determining whether resolving the new query using information associated with the update time of the variant table is acceptable comprises:
   informing a client computing device of an update time of the data table and the update time of the variant table; and
   receiving, in response to the informing the client computing device of the update time, an indication of whether resolving the new query using information associated with the update time of the variant table is acceptable.

8. The method of claim 1, wherein determining that the data table includes the problematic key comprises:
   attempting, within the threshold time period, to generate the query results for the plurality of queries using the data table; and
   failing, within the threshold time period, to generate the query results.

9. A non-transitory computer-readable medium comprising instructions which, when executed by a computer, cause the computer to:
   determine that a data table includes a problematic key, wherein the problematic key includes a key used in a plurality of queries that fails to generate query results within a threshold time period;
   create, in response to determining that the data table includes the problematic key, a variant table configured to store at least a portion of the data in the data table and optimize processing queries using the problematic key;
   store an update time of the variant table;

receive a new query including a key;

determine whether the query key is the problematic key;

determine whether resolving the new query using information associated with the update time of the variant table is acceptable;

upon determining that the query key is a problematic key and that resolving the new query using information associated with the update time of the variant table is acceptable, generate a result for the new query using the variant table; and upon determining that the query key is not a problematic key or that resolving the new query using information associated with the update time of the variant table is unacceptable, generate a result for the new query using the data table.

10. The computer-readable medium of claim 9, further comprising instructions which, when executed by the computer, cause the computer to provide an output including the generated result for the new query.

11. The computer-readable medium of claim 9, further comprising instructions which, when executed by the computer, cause the computer to:

receive an update for the data table;

update the data table responsive to the received update; and forego updating the variant table and the update time of the variant table responsive to the received update.

12. The computer-readable medium of claim 9, further comprising instructions which, when executed by the computer, cause the computer to:

set a refresh variant table priority value to an initial level;

upon determining that resolving the new query using information associated with the update time of the variant table is unacceptable, adjust the refresh variant table priority value; and upon determining that the refresh variant table priority value exceeds a threshold value:

update the variant table based on the at least a portion of the data in the data table;

update the update time of the variant table; and reset the refresh variant table priority value to a level associated with the variant table being updated.

13. The computer-readable medium of claim 9, wherein the data table is associated with a first data model, and wherein the variant table is associated with a second data model, different from the first data model.

14. The computer-readable medium of claim 13, wherein the second data model is partitioned by the one or more problematic keys.

15. The computer-readable medium of claim 9, wherein: instructions to determine whether resolving the new query using information associated with the update time of the variant table is acceptable comprise instructions which, when executed by the computer, cause the computer to:

inform a client computing device of an update time of the data table and the update time of the variant table; and receive, in response to informing the client computing device of the update time, an indication of whether resolving the new query using information associated with the update time of the variant table is acceptable.

16. The computer-readable medium of claim 9, wherein: instructions to determine that the data table includes a problematic key comprise instructions which, when executed by the computer, cause the computer to:

attempt, within the threshold time period, to generate the query results for the plurality of queries using the data table; and fail, within the threshold time period, to generate the query results.

17. A system comprising:

one or more processors; and a memory comprising instructions which, when executed by the one or more processors, cause the one or more processors to:

determine that a data table includes a problematic key, wherein the problematic key includes a key used in a plurality of queries that fails to generate query results within a threshold time period;

create, in response to determining that the data table includes the problematic key, a variant table configured to store at least a portion of the data in the data table and optimize processing queries using the problematic key;

store an update time of the variant table;

receive a new query including a query key;

determine whether the query key is the problematic key;

determine whether resolving the new query using information associated with the update time of the variant table is acceptable;

upon determining that the query key is a problematic key and that resolving the new query using information associated with the update time of the variant table is acceptable, generate a result for the new query using the variant table; and upon determining that the query key is not a problematic key or that resolving the new query using information associated with the update time of the variant table is unacceptable, generate a result for the new query using the data table.

18. The system of claim 17, the memory further comprising instructions which, when executed by the one or more processors, cause the one or more processors to provide an output including the generated result for the new query.

19. The system of claim 17, the memory further comprising instructions which, when executed by the one or more processors, cause the one or more processors to:

receive an update for the data table;

update the data table responsive to the received update; and forego updating the variant table and the update time of the variant table responsive to the received update.

20. The system of claim 17, the memory further comprising instructions which, when executed by the one or more processors, cause the one or more processors to:

set a refresh variant table priority value to an initial level;

upon determining that resolving the new query using information associated with the update time of the variant table is unacceptable, adjust the refresh variant table priority value; and upon determining that the refresh variant table priority value exceeds a threshold value:

update the variant table based on the at least a portion of the data in the data table;

update the update time of the variant table; and reset the refresh variant table priority value to a level associated with the variant table being updated.

* * * * *